United States Patent
Wang

(10) Patent No.: US 11,221,466 B2
(45) Date of Patent: Jan. 11, 2022

(54) CAMERA OPTICAL LENS

(71) Applicant: AAC Optics Solutions Pte. Ltd., Singapore (SG)

(72) Inventor: Kang Wang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 0 days.

(21) Appl. No.: 17/008,677

(22) Filed: Sep. 1, 2020

(65) Prior Publication Data

US 2021/0173184 A1 Jun. 10, 2021

(30) Foreign Application Priority Data

Dec. 5, 2019 (CN) .......................... 201911234943.X

(51) Int. Cl.
 G02B 13/00 (2006.01)
 G02B 9/64 (2006.01)

(52) U.S. Cl.
 CPC ........... G02B 13/0045 (2013.01); G02B 9/64 (2013.01)

(58) Field of Classification Search
 CPC ...... G02B 13/0045; G02B 9/64; G02B 13/06; G02B 13/18
 USPC ................. 359/755, 682, 749, 759, 751, 657
 See application file for complete search history.

(56) References Cited

U.S. PATENT DOCUMENTS

| | | | | |
|---|---|---|---|---|
| 2014/0009843 A1* | 1/2014 | Tsai | .................... | G02B 13/0045 359/708 |
| 2014/0139719 A1* | 5/2014 | Fukaya | .............. | G02B 13/0045 348/340 |
| 2014/0253782 A1* | 9/2014 | Tsai | .................... | G02B 13/0045 348/335 |
| 2015/0268448 A1* | 9/2015 | Kubota | .............. | G02B 13/0045 359/755 |
| 2016/0124191 A1* | 5/2016 | Hashimoto | ........ | G02B 13/0045 359/708 |
| 2018/0196226 A1* | 7/2018 | Chang | ................ | G02B 13/0045 |
| 2018/0196235 A1* | 7/2018 | Chang | ................ | G02B 13/0045 |
| 2019/0170987 A1* | 6/2019 | Gao | ................ | G02B 13/0045 |
| 2019/0243106 A1* | 8/2019 | Xu | ..................... | G02B 13/0045 |
| 2019/0369359 A1* | 12/2019 | Son | .................... | G02B 13/0045 |

(Continued)

FOREIGN PATENT DOCUMENTS

CN 202886720 U 4/2013
CN 203606556 U 5/2014

(Continued)

*Primary Examiner* — Marin Pichler
*Assistant Examiner* — Alberto J Betancourt
(74) *Attorney, Agent, or Firm* — W&G Law Group

(57) ABSTRACT

The present disclosure relates to the field of optical lenses and provides a camera optical lens sequentially including, from an object side to an image side, first to seventh lenses. The camera optical lens satisfies following conditions: $1.80 \leq f4/f \leq 5.00$; $-1.50 \leq f6/f7 \leq -1.00$; and $1.20 \leq d8/d9 \leq 1.60$, where f denotes a focal length of the camera optical lens; f4, f6 and f7 denote focal lengths of the fourth, sixth and seventh lenses, respectively; d8 denotes an on-axis distance from an image side surface of the fourth lens to an object side surface of the fifth lens; and d9 denotes an on-axis thickness of the fifth lens. The camera optical lens according to the present disclosure can achieve high optical performance while satisfying design requirements for ultra-thin, wide-angle lenses having large apertures.

9 Claims, 9 Drawing Sheets

(56) References Cited

U.S. PATENT DOCUMENTS

| | | | |
|---|---|---|---|
| 2019/0369360 A1* | 12/2019 | Jung | G02B 13/0045 |
| 2019/0369361 A1* | 12/2019 | Yoo | G02B 13/0045 |
| 2019/0369362 A1* | 12/2019 | Son | G02B 13/0045 |
| 2019/0369365 A1* | 12/2019 | Kim | G02B 13/0045 |
| 2019/0369366 A1* | 12/2019 | Baik | G02B 13/0045 |
| 2019/0369367 A1* | 12/2019 | Park | G02B 13/0045 |
| 2019/0369368 A1* | 12/2019 | Jung | G02B 13/0045 |
| 2021/0055514 A1* | 2/2021 | Dai | G02B 13/0045 |
| 2021/0231925 A1* | 7/2021 | You | G02B 13/0045 |

FOREIGN PATENT DOCUMENTS

| | | |
|---|---|---|
| CN | 204188865 U | 3/2015 |
| CN | 107577034 A | 1/2018 |
| CN | 107664817 A | 2/2018 |
| CN | 107678134 A | 2/2018 |
| CN | 107797244 A | 3/2018 |
| CN | 207764467 U | 8/2018 |
| CN | 109491051 A | 3/2019 |
| CN | 109828357 A | 5/2019 |
| CN | 110161664 A | 8/2019 |
| CN | 110262007 A | 9/2019 |
| CN | 110361836 A | 10/2019 |
| CN | 110361849 A | 10/2019 |
| CN | 110488464 A | 11/2019 |
| JP | 2012155223 A | 8/2012 |
| JP | 2015072405 A | 4/2015 |
| JP | 2015114505 A | 6/2015 |

* cited by examiner

CAMERA OPTICAL LENS

TECHNICAL FIELD

The present disclosure relates to the field of optical lens, and more particularly, to a camera optical lens suitable for handheld terminal devices, such as smart phones or digital cameras, and camera devices, such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is becoming increasingly higher, a five-piece or six-piece or seven-piece lens structure gradually emerges in lens designs. There is a demand for an ultra-thin, wide-angle camera lens having excellent optical features.

SUMMARY

In view of the problems, the present disclosure aims to provide a camera optical lens, which can achieve high imaging performance while satisfying requirements for ultra-thin, wide-angle lenses.

In an embodiment, the present disclosure provides a camera optical lens. The camera optical lens sequentially includes, from an object side to an image side: a first lens having a positive refractive power; a second lens having a negative refractive power; a third lens having a negative refractive power; a fourth lens having a positive refractive power; a fifth lens having a negative refractive power; a sixth lens having a positive refractive power; and a seventh lens having a negative refractive power. The camera optical lens satisfies following conditions: $1.80 \leq f4/f \leq 5.00$; $-1.50 \leq f6/f7 \leq -1.00$; and $1.20 \leq d8/d9 \leq 1.60$, where f denotes a focal length of the camera optical lens; f4 denotes a focal length of the fourth lens; f6 denotes a focal length of the sixth lens; f7 denotes a focal length of the seventh lens; d8 denotes an on-axis distance from an image side surface of the fourth lens to an object side surface of the fifth lens; and d9 denotes an on-axis thickness of the fifth lens.

The present disclosure has advantageous effects in that the camera optical lens according to the present disclosure has excellent optical characteristics and is ultra-thin, wide-angle, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
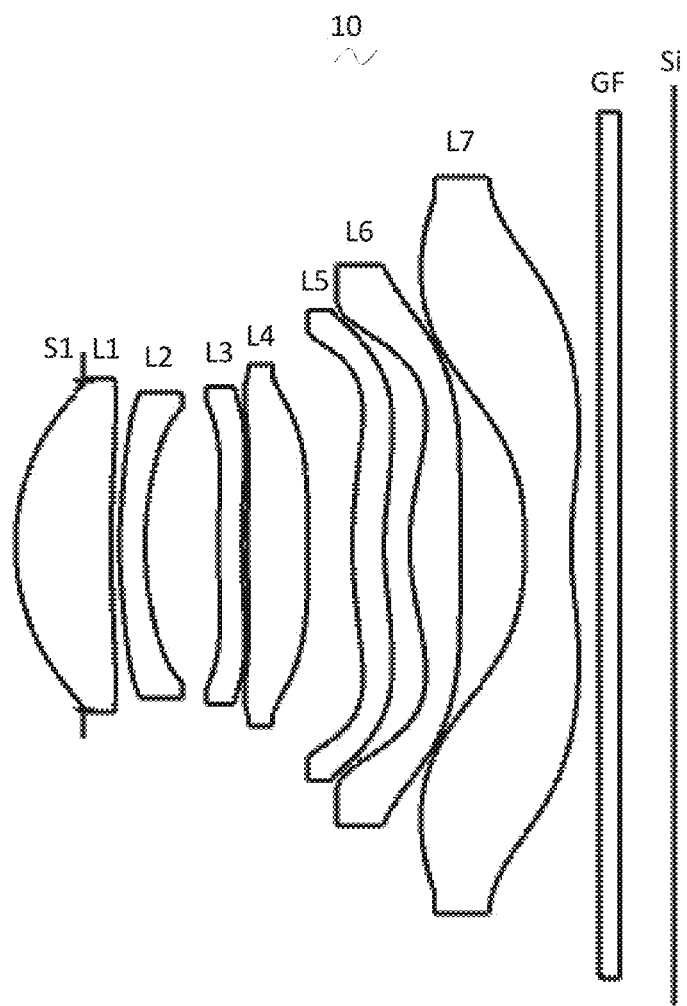
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 7 lenses. Specifically, the camera optical lens 10 sequentially includes, from an object side to an image side, an aperture S1, a first lens L1, a second lens L2, a third lens L3, a fourth lens L4, a fifth lens L5, a sixth lens L6, and a seventh lens L7. An optical element such as a glass filter (GF) can be arranged between the seventh lens L7 and an image plane Si.

A focal length of the camera optical lens 10 is defined as f, and a focal length of the fourth lens L4 is defined as f4. The camera optical lens 10 should satisfy a condition of $1.80 \leq f4/f \leq 5.00$. The appropriate distribution of the refractive power leads to better imaging quality and a lower sensitivity. As an example, $2.26 \leq f4/f \leq 4.90$.

A focal length of the sixth lens L6 is defined as f6, and a focal length of the seventh lens L7 is defined as P. The camera optical lens 10 should satisfy a condition of $-1.50 \leq f6/f7 \leq -1.00$. This leads to the effective distribution of the refractive powers of the sixth lens L6 and the seventh lens L7 and facilitates correction of aberrations of the optical system, thereby improving imaging quality. As an example, $-1.47 \leq f6/f7 \leq -1.09$.

An on-axis distance from an image side surface of the fourth lens L4 to an object side surface of the fifth lens L5 is defined as d8, and an on-axis thickness of the fifth lens L5 is defined as d9. The camera optical lens 10 should satisfy a condition of $1.20 \leq d8/d9 \leq 1.60$. When the condition is satisfied, the total length of the optical system can be reduced, thereby achieving ultra-thin lenses. As an example, $1.21 \leq d8/d9 \leq 1.58$.

When the focal length of the camera optical lens, the focal lengths of the lenses, the on-axis distances between an image side surface and an object side surfaces of the lenses, and the on-axis thicknesses of the lenses satisfy the above conditions, and the camera optical lens 10 can satisfy design requirements for high performance and a low TTL (a total optical length from an object side surface of the first lens L1 to an image plane of the camera optical lens 10 along an optic axis).

A curvature radius of the object side surface of the fourth lens L4 is defined as R7, and a curvature radius of an image side surface of the fourth lens L4 is defined as R8. The camera optical lens 10 should satisfy a condition of $-0.80 \leq (R7+R8)/(R7-R8) \leq -0.10$, which specifies a shape of the fourth lens L4. This can facilitate correction of an off-axis aberration with development towards ultra-thin, wide-angle lenses. As an example, $-0.75 \leq (R7+R8)/(R7-R8) \leq -0.10$.

A curvature radius of an object side surface of the second lens L2 is defined as R3, and a curvature radius of an image side surface of the second lens L2 is defined as R4. The camera optical lens 10 should satisfy a condition of $3.00 \leq (R3+R4)/(R3-R4) \leq 15.00$, which specifies a shape of the second lens L2. When the condition is satisfied, the deflection of light passing through the lens can be alleviated, and aberrations can be effectively reduced. As an example, $4.43 \leq (R3+R4)/(R3-R4) \leq 14.49$.

A focal length of the first lens L1 is defined as f1. The camera optical lens 10 should satisfy a condition of $0.52 \leq f1/f \leq 1.79$, which specifies a ratio of the refractive power of the first lens L1 to the focal length of the camera optical lens 10. When the condition is satisfied, the first lens can have an appropriate positive refractive power, thereby facilitating reducing aberrations of the system while facilitating development towards ultra-thin, wide-angle lenses. As an example, $0.83 \leq f1/f \leq 1.43$.

A curvature radius of the object side surface of the first lens L1 is defined as R1, and a curvature radius of an image side surface of the first lens L1 is defined as R2. The camera optical lens 10 should satisfy a condition of $-4.86 \leq (R1+R2)/(R1-R2) \leq -1.19$. This can reasonably control a shape of the first lens L1, so that the first lens L1 can effectively correct spherical aberrations of the system. As an example, $-3.04 \leq (R1+R2)/(R1-R2) \leq -1.48$.

An on-axis thickness of the first lens L1 is defined as d1, and the total optical length from the object side surface of the first lens L1 to an image plane of the camera optical lens 10 along an optic axis is defined as TTL. The camera optical lens 10 should satisfy a condition of $0.07 \leq d1/TTL \leq 0.22$. This can facilitate achieving ultra-thin lenses. As an example, $0.12 \leq d1/TTL \leq 0.18$.

The focal length of the camera optical lens 10 is f, and a focal length of the second lens L2 is f2. The camera optical lens 10 further satisfies a condition of $-17.04 \leq f2/f \leq -2.22$. By controlling the negative refractive power of the second lens L2 within the reasonable range, correction of aberrations of the optical system can be facilitated. As an example, $-10.65 \leq f2/f \leq -2.78$.

An on-axis thickness of the second lens L2 is defined as d3. The camera optical lens 10 should satisfy a condition of $0.02 \leq d3/TTL \leq 0.06$. This can facilitate achieving ultra-thin lenses. As an example, $0.03 \leq d3/TTL \leq 0.05$.

The focal length of the camera optical lens 10 is f, and the focal length of the third lens L3 is f3. The camera optical lens 10 further satisfies a condition of $-12.70 \leq f3/f \leq -2.67$. The appropriate distribution of the refractive power leads to better imaging quality and a lower sensitivity. As an example, $-7.94 \leq f3/f \leq -3.34$.

A curvature radius of an object side surface of the third lens L3 is defined as R5, and a curvature radius of an image side surface of the third lens L3 is defined as R6. The camera optical lens 10 should satisfy a condition of $1.17 \leq (R5+R6)/(R5-R6) \leq 4.73$. This can reasonably control a shape of the third lens L3, thereby facilitating shaping of the third lens L3. When the condition is satisfied, the deflection of light passing through the lens can be alleviated, and aberrations can be effectively reduced. As an example, $1.87 \leq (R5+R6)/(R5-R6) \leq 3.79$.

An on-axis thickness of the third lens L3 is defined as d5. The camera optical lens 10 should satisfy a condition of $0.02 \leq d5/TTL \leq 0.06$. This can facilitate achieving ultra-thin lenses. As an example, $0.03 \leq d5/TTL \leq 0.05$.

The focal length of the camera optical lens 10 is f, and the focal length of the fifth lens L5 is f5. The camera optical lens 10 further satisfies a condition of $-109.16 \leq f5/f \leq -2.43$. This condition can effectively make a light angle of the camera optical lens 10 gentle and reduce the tolerance sensitivity. As an example, $-68.23 \leq f5/f \leq -3.04$.

A curvature radius of the object side surface of the fifth lens L5 is defined as R9, and a curvature radius of the image side surface of the fifth lens L5 is defined as R10. The camera optical lens 10 should satisfy a condition of $3.34 \leq (R9+R10)/(R9-R10) \leq 53.34$, which specifies a shape of the fifth lens L5. This can facilitate correction of an off-axis aberration with development towards ultra-thin, wide-angle lenses. As an example, $5.35 \leq (R9+R10)/(R9-R10) \leq 42.67$.

An on-axis thickness of the fifth lens L5 is defined as d9. The camera optical lens 10 should satisfy a condition of $0.02 \leq d9/TTL \leq 0.08$. When the condition is satisfied, the total length of the optical system can be reduced, thereby achieving ultra-thin lenses. As an example, $0.04 \leq d9/TTL \leq 0.06$.

The focal length of the camera optical lens 10 is f, and the focal length of the sixth lens L6 is f6. The camera optical lens 10 further satisfies a condition of $0.38 \leq f6/f \leq 1.39$. The appropriate distribution of the refractive power leads to better imaging quality and a lower sensitivity. As an example, $0.62 \leq f6/f \leq 1.11$.

A curvature radius of an object side surface of the sixth lens L6 is defined as R11, and a curvature radius of an image side surface of the sixth lens L6 is defined as R12. The camera optical lens 10 should satisfy a condition of $-1.54 \leq (R11+R12)/(R11-R12) \leq -0.50$, which specifies a shape of the sixth lens L6. This can facilitate correction of an off-axis aberration with development towards ultra-thin, wide-angle lenses. As an example, $-0.96 \leq (R11+R12)/(R11-R12) \leq -0.63$.

An on-axis thickness of the sixth lens L6 is defined as d11. The camera optical lens 10 should satisfy a condition of $0.04 \leq d11/TTL \leq 0.13$. This can facilitate achieving ultra-thin lenses. As an example, $0.06 \leq d11/TTL \leq 0.10$.

The focal length of the camera optical lens 10 is f, and a focal length of the seventh lens L7 is defined as f7. The camera optical lens 10 should satisfy a condition of −1.31≤f7/f≤−0.40. The appropriate distribution of the refractive power leads to better imaging quality and a lower sensitivity. As an example, −0.82≤f7/f≤−0.50.

A curvature radius of an object side surface of the seventh lens L7 is defined as R13, and a curvature radius of an image side surface of the seventh lens L7 is defined as R14. The camera optical lens 10 further satisfies a condition of 0.07≤ (R13+R14)/(R13−R14)≤0.32, which specifies a shape of the seventh lens L7. This can facilitate correction of an off-axis aberration with development towards ultra-thin, wide-angle lenses. As an example, 0.11≤(R13+R14)/(R13−R14)≤0.26.

An on-axis thickness of the seventh lens L7 is defined as d13. The camera optical lens 10 should satisfy a condition of 0.03≤d13/TTL≤0.11. This can facilitate achieving ultra-thin lenses. As an example, 0.06≤d13/TTL≤0.09.

A combined focal length of the first lens L1 and the second lens L2 is defined as f12. The camera optical lens 10 further satisfies a condition of 5.77≤f12/f≤9.00. This can eliminate aberration and distortion of the camera optical lens 10, suppress the back focal length of the camera optical lens 10, and maintain miniaturization of the camera lens system group. As an example, 6.49≤f12/f≤8.25.

In this embodiment, the total optical length TTL of the camera optical lens 10 is smaller than or equal to 7.37 mm, which is beneficial for achieving ultra-thin lenses. As an example, the total optical length TTL of the camera optical lens 10 is smaller than or equal to 7.04 mm.

In this embodiment, an F number of the camera optical lens 10 is smaller than or equal to 1.61. The camera optical lens 10 has a large aperture and better imaging performance. As an example, the F number of the camera optical lens 10 is smaller than or equal to 1.60.

With such design, the total optical length TTL of the camera optical lens 10 can be made as short as possible, and thus the miniaturization characteristics can be maintained.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image plane of the camera optical lens along the optic axis) in mm.

In an example, inflexion points and/or arrest points can be arranged on the object side surface and/or image side surface of the lens, so as to satisfy the demand for the high quality imaging. The description below can be referred to for specific implementations.

Table 1 and Table 2 show design data of the camera optical lens 10 according to Embodiment 1 of the present disclosure.

TABLE 1

|  | R | d | nd | vd |
|---|---|---|---|---|
| S1 | ∞ | d0 = −0.695 | | |
| R1 | 2.391 | d1 = 0.967 | nd1 1.5450 | v1 55.81 |
| R2 | 8.521 | d2 = 0.091 | | |
| R3 | 4.678 | d3 = 0.255 | nd2 1.6610 | v2 20.53 |
| R4 | 3.315 | d4 = 0.747 | | |
| R5 | 13.812 | d5 = 0.236 | nd3 1.6610 | v3 20.53 |
| R6 | 7.163 | d6 = 0.056 | | |
| R7 | 11.792 | d7 = 0.613 | nd4 1.5450 | v4 55.81 |
| R8 | −26.707 | d8 = 0.449 | | |
| R9 | 4.015 | d9 = 0.320 | nd5 1.6359 | v5 23.82 |

TABLE 1-continued

|  | R | d | nd | vd |
|---|---|---|---|---|
| R10 | 2.970 | d10 = 0.263 | | |
| R11 | 2.615 | d11 = 0.516 | nd6 1.5450 | v6 55.81 |
| R12 | −19.942 | d12 = 0.651 | | |
| R13 | −4.591 | d13 = 0.466 | nd7 1.5346 | v7 55.69 |
| R14 | 3.479 | d14 = 0.281 | | |
| R15 | ∞ | d15 = 0.210 | ndg 1.5168 | vg 64.17 |
| R16 | ∞ | d16 = 0.558 | | |

In the table, meanings of various symbols will be described as follows.

S1: aperture;
R: curvature radius of an optical surface; a central curvature radius for a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of the object side surface of the seventh lens L7;
R14: curvature radius of the image side surface of the seventh lens L7;
R15: curvature radius of an object side surface of the optical filter GF;
R16: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;

d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7
vg: abbe number of the optical filter GF.

Table 2 shows aspheric surface data of respective lens in the camera optical lens 10 according to Embodiment 1 of the present disclosure.

In Table 2, k is a conic coefficient, and A4, A6, A8, A10, A12, A14, A16, A18 and A20 are aspheric surface coefficients.

IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

In the present embodiment, an aspheric surface of each lens surface uses the aspheric surfaces shown in the above condition (1). However, the present disclosure is not limited to the aspherical polynomial form shown in the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively; P6R1 and P6R2 represent the object side surface and the image side surface of the sixth lens L6, respectively; and P7R1 and P7R2 represent the object side surface and the image side surface of the seventh lens L7, respectively. The data in the column "inflexion point position" refers to vertical distances from inflexion points arranged on each lens surface to the optic axis of the camera optical lens 10. The data in the column "arrest point posi-

TABLE 2

| | Conic coefficient | Aspherical surface coefficients | | | |
|---|---|---|---|---|---|
| | k | A4 | A6 | A8 | A10 |
| R1 | −6.2190E−02 | −1.8330E−04 | 3.4177E−03 | −6.1285E−03 | 7.2891E−03 |
| R2 | −1.6439E+01 | −4.9708E−02 | 5.0118E−02 | −3.3692E−02 | 1.4738E−02 |
| R3 | 4.1808E+00 | −8.5737E−02 | 6.2553E−02 | −2.1309E−02 | −1.0866E−02 |
| R4 | 3.5757E+00 | −4.7288E−02 | 2.0459E−02 | 1.9840E−02 | −5.7826E−02 |
| R5 | 6.6952E+01 | −3.2461E−02 | −3.5052E−03 | −1.0305E−04 | 1.4161E−02 |
| R6 | −3.2198E+01 | −2.1647E−02 | −2.8725E−02 | 5.3913E−02 | −4.6167E−02 |
| R7 | 2.0153E+01 | −3.0275E−02 | −1.3858E−02 | 2.8748E−02 | 4.1728E−02 |
| R8 | 6.0376E+01 | −4.0433E−02 | 2.6811E−02 | −5.6267E−02 | 6.3608E−02 |
| R9 | −2.6407E+01 | −4.8109E−02 | 7.0223E−02 | −5.8531E−02 | 2.8054E−02 |
| R10 | −1.9596E+01 | −8.9626E−02 | 7.5038E−02 | −3.9268E−02 | 1.0989E−02 |
| R11 | −9.1461E+00 | −1.1892E−02 | −2.1018E−02 | 1.4800E−02 | −6.3386E−03 |
| R12 | 4.0061E+01 | 4.4565E−02 | −4.9467E−02 | 2.3928E−02 | −7.1938E−03 |
| R13 | −5.9168E−01 | −8.7411E−02 | 2.3647E−02 | −1.7610E−03 | −1.1223E−04 |
| R14 | −1.5882E+01 | −5.7998E−02 | 2.0122E−02 | −4.6306E−03 | 7.3459E−04 |

| | Aspherical surface coefficients | | | | |
|---|---|---|---|---|---|
| | A12 | A14 | A16 | A18 | A20 |
| R1 | −5.5252E−03 | 2.6066E−03 | −7.4889E−04 | 1.1897E−04 | −8.2760E−06 |
| R2 | −3.6822E−03 | 1.1844E−04 | 2.1223E−04 | −5.7545E−05 | 4.9179E−06 |
| R3 | 1.9309E−02 | −1.2071E−02 | 4.1504E−03 | −7.6934E−04 | 6.0472E−05 |
| R4 | 6.7876E−02 | −4.8107E−02 | 2.1079E−02 | −5.2606E−03 | 5.7537E−04 |
| R5 | −3.6275E−02 | 3.5652E−02 | −1.7840E−02 | 4.5178E−03 | −4.5075E−04 |
| R6 | 1.8563E−02 | −4.1608E−03 | 1.0298E−03 | −2.9897E−04 | 3.8729E−05 |
| R7 | −6.0606E−02 | 3.8204E−02 | −1.2484E−02 | 2.0811E−03 | −1.4078E−04 |
| R8 | −4.5274E−02 | 2.0825E−02 | −5.9445E−03 | 9.5274E−04 | −6.4873E−05 |
| R9 | −8.6888E−03 | 1.6025E−03 | −1.3362E−04 | −2.8405E−06 | 9.0957E−07 |
| R10 | −1.4111E−03 | −1.1062E−04 | 7.3997E−05 | −1.0960E−05 | 5.7020E−07 |
| R11 | 1.4323E−03 | −1.5457E−04 | 4.3484E−07 | 1.5972E−06 | −1.0905E−07 |
| R12 | 1.3882E−03 | −1.7393E−04 | 1.3925E−05 | −6.5441E−07 | 1.3772E−08 |
| R13 | 2.7484E−05 | −1.6301E−06 | 1.3984E−08 | 2.0417E−09 | −5.8484E−11 |
| R14 | −8.6272E−05 | 7.3108E−06 | −4.0626E−07 | 1.2918E−08 | −1.7642E−10 | tion" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 1.625 | | |
| P1R2 | 1 | 1.065 | | |
| P2R1 | 0 | | | |
| P2R2 | 0 | | | |
| P3R1 | 2 | 0.455 | 1.425 | |
| P3R2 | 2 | 0.565 | 1.525 | |
| P4R1 | 2 | 0.465 | 1.355 | |
| P4R2 | 1 | 1.595 | | |
| P5R1 | 2 | 0.925 | 2.135 | |
| P5R2 | 2 | 0.535 | 2.345 | |
| P6R1 | 2 | 0.755 | 2.245 | |
| P6R2 | 3 | 0.395 | 0.605 | 2.485 |
| P7R1 | 1 | 1.625 | | |
| P7R2 | 3 | 0.575 | 3.065 | 3.865 |

TABLE 4

| | Number of arrest points | Arrest point position 1 | Arrest point position 2 |
|---|---|---|---|
| P1R1 | 0 | | |
| P1R2 | 1 | 1.505 | |
| P2R1 | 0 | | |
| P2R2 | 0 | | |
| P3R1 | 1 | 0.765 | |
| P3R2 | 1 | 0.995 | |
| P4R1 | 2 | 0.825 | 1.565 |
| P4R2 | 1 | 1.835 | |
| P5R1 | 1 | 1.385 | |
| P5R2 | 2 | 1.245 | 2.475 |
| P6R1 | 1 | 1.345 | |
| P6R2 | 0 | | |
| P7R1 | 1 | 2.885 | |
| P7R2 | 1 | 1.225 | |

Figure 2:
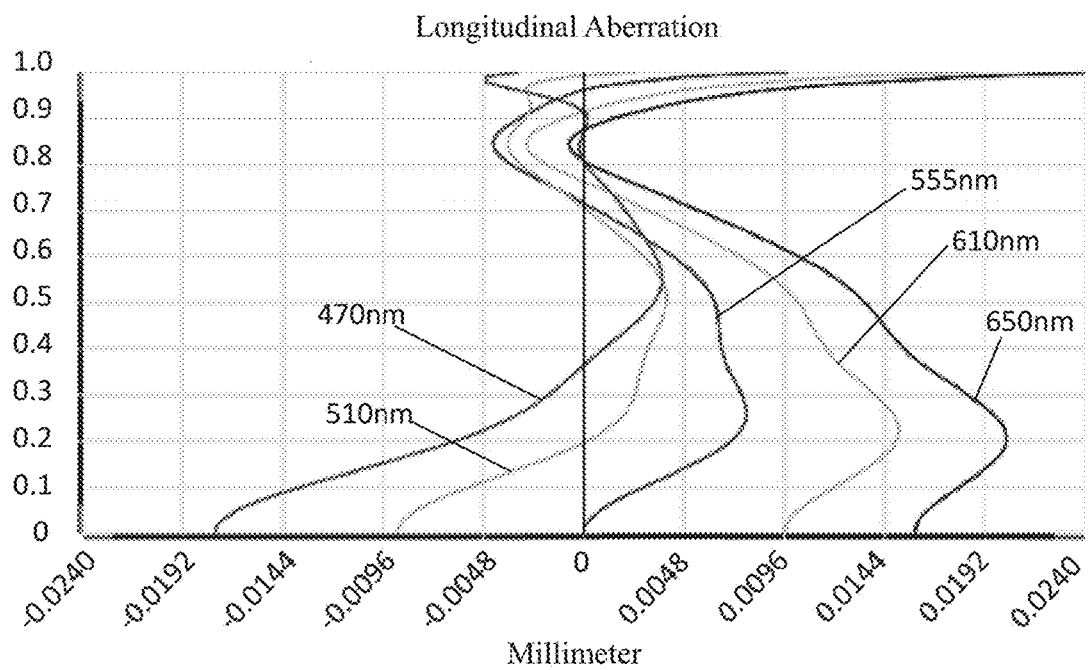
FIG. 2 is a schematic diagram of a longitudinal aberration of the camera optical lens shown in FIG. 1.
Figure 3:
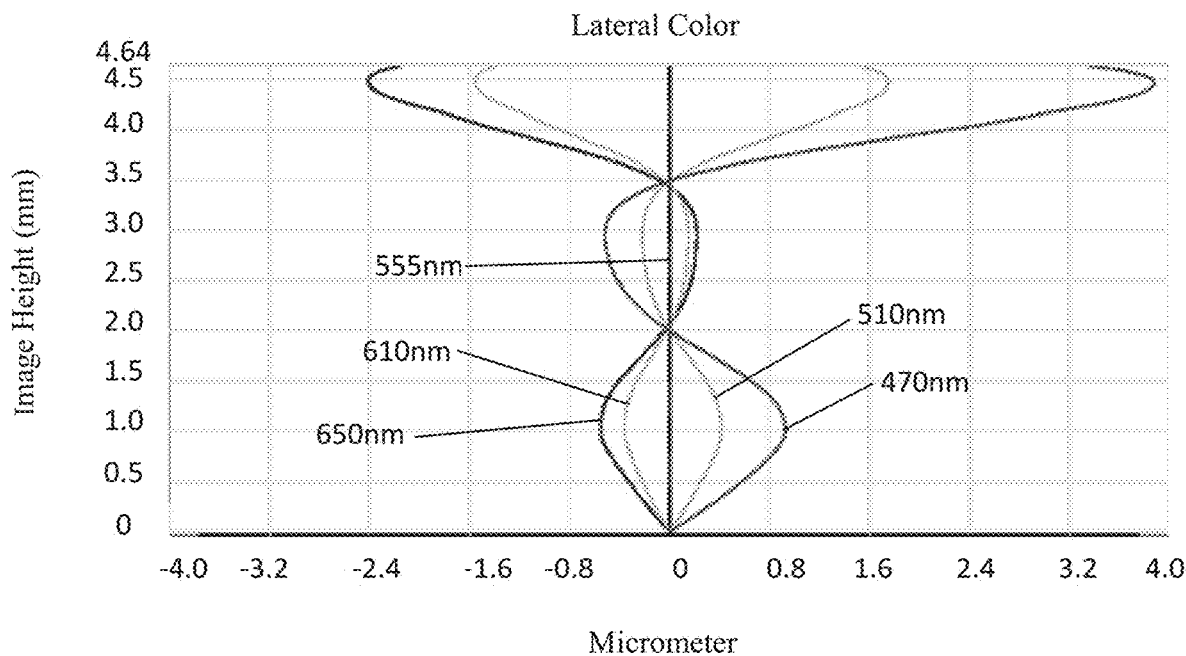
FIG. 3 is a schematic diagram of a lateral color of the camera optical lens shown in FIG. 1.
Figure 4:
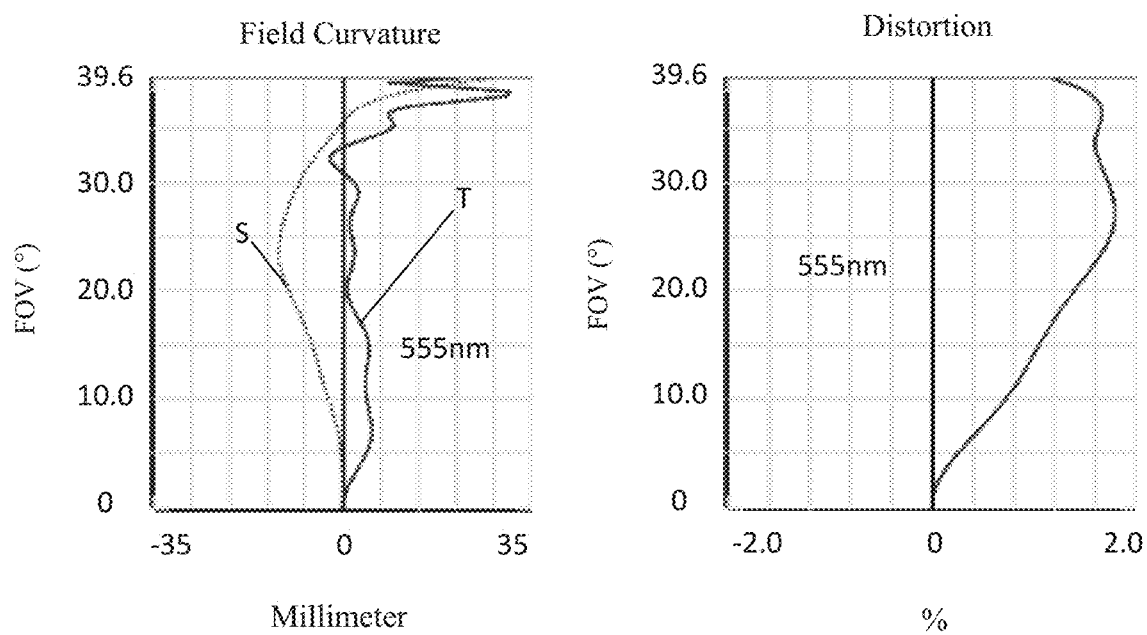
FIG. 4 is a schematic diagram of a field curvature and a distortion of the camera optical lens shown in FIG. 1.
Figure 5:
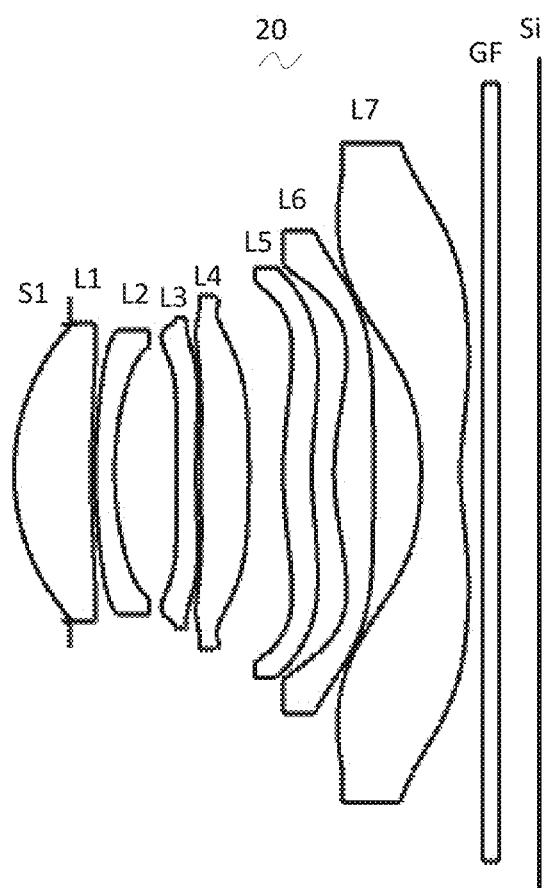
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 650 nm, 610 nm, 555 nm, 510 nm and 470 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 below further lists various values of Embodiments 1, 2 and 3 and values corresponding to parameters which are specified in the above conditions.

As shown in Table 13, Embodiment 1 satisfies the respective conditions.

In this embodiment, the entrance pupil diameter of the camera optical lens is 3.463 mm. The image height of 1.0H is 4.636 mm. The FOV (field of view) along a diagonal direction is 79.20°. Thus, the camera optical lens can provide an ultra-thin, wide-angle lens while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

Table 5 and Table 6 show design data of a camera optical lens 20 in Embodiment 2 of the present disclosure.

TABLE 5

| | R | d | nd | vd |
|---|---|---|---|---|
| S1 | ∞ | d0 = −0.718 | | |
| R1 | 2.357 | d1 = 0.983 | nd1 1.5450 | v1 55.81 |
| R2 | 6.857 | d2 = 0.051 | | |
| R3 | 4.145 | d3 = 0.251 | nd2 1.6610 | v2 20.53 |
| R4 | 3.308 | d4 = 0.786 | | |
| R5 | 21.940 | d5 = 0.252 | nd3 1.6610 | v3 20.53 |
| R6 | 8.796 | d6 = 0.064 | | |
| R7 | 18.775 | d7 = 0.611 | nd4 1.5450 | v4 55.81 |
| R8 | −23.297 | d8 = 0.438 | | |
| R9 | 3.552 | d9 = 0.362 | nd5 1.6359 | v5 23.82 |
| R10 | 2.933 | d10 = 0.289 | | |
| R11 | 2.650 | d11 = 0.504 | nd6 1.5450 | v6 55.81 |
| R12 | −20.298 | d12 = 0.603 | | |
| R13 | −4.673 | d13 = 0.506 | nd7 1.5346 | v7 55.69 |
| R14 | 3.028 | d14 = 0.281 | | |
| R15 | ∞ | d15 = 0.210 | ndg 1.5168 | vg 64.17 |
| R16 | ∞ | d16 = 0.510 | | |

Table 6 shows aspheric surface data of respective lenses in the camera optical lens 20 according to Embodiment 2 of the present disclosure.

TABLE 6

| | Conic coefficient | Aspherical surface coefficients | | | |
|---|---|---|---|---|---|
| | k | A4 | A6 | A8 | A10 |
| R1 | −4.6892E−02 | 6.6611E−04 | 7.8384E−04 | 5.2149E−04 | −2.1918E−03 |
| R2 | −2.2289E+01 | −9.2953E−02 | 1.3935E−01 | −1.4268E−01 | 1.0698E−01 |
| R3 | 3.5549E+00 | −1.2241E−01 | 1.3569E−01 | −1.1084E−01 | 6.5051E−02 |
| R4 | 3.6680E+00 | −4.2079E−02 | 1.6439E−02 | 3.5814E−02 | −9.6026E−02 |
| R5 | 7.8725E+01 | −2.7595E−02 | −2.9307E−02 | 4.9760E−02 | −5.5939E−02 |
| R6 | −4.9233E+01 | −1.6649E−02 | −4.0921E−02 | 6.4066E−02 | −6.1746E−02 |
| R7 | 4.5809E+01 | −2.9248E−02 | 4.8962E−04 | −1.9829E−02 | 5.3981E−02 |
| R8 | 9.7458E+01 | −6.0680E−02 | 5.2799E−02 | −7.5183E−02 | 7.0255E−02 |
| R9 | −3.0469E+01 | 0.0000E+00 | 0.0000E+00 | 0.0000E+00 | 0.0000E+00 |
| R10 | −2.4236E+01 | 0.0000E+00 | 0.0000E+00 | 0.0000E+00 | 0.0000E+00 |
| R11 | −1.0331E+01 | −1.2787E−02 | −1.5888E−02 | 9.6526E−03 | −3.1958E−03 |
| R12 | 3.9661E+01 | 4.4739E−02 | −4.9936E−02 | 2.3192E−02 | −6.6205E−03 |
| R13 | −5.7043E−01 | −8.5101E−02 | 2.2812E−02 | −1.7247E−03 | −9.0307E−05 |
| R14 | −1.7694E+01 | −4.7683E−02 | 1.4562E−02 | −2.7242E−03 | 3.3256E−04 |

TABLE 6-continued

| | Aspherical surface coefficients | | | | |
|---|---|---|---|---|---|
| | A12 | A14 | A16 | A18 | A20 |
| R1 | 2.6563E−03 | −1.7205E−03 | 6.2619E−04 | −1.2247E−04 | 9.7258E−06 |
| R2 | −5.8199E−02 | 2.2003E−02 | −5.4416E−03 | 7.8749E−04 | −5.0421E−05 |
| R3 | −2.7235E−02 | 8.0571E−03 | −1.6102E−03 | 2.0039E−04 | −1.1221E−05 |
| R4 | 1.1813E−01 | −8.8502E−02 | 4.0905E−02 | −1.0721E−02 | 1.2225E−03 |
| R5 | 2.9761E−02 | −3.3851E−03 | −4.1825E−03 | 1.9859E−03 | −2.6210E−04 |
| R6 | 3.6270E−02 | −1.5074E−02 | 4.7193E−03 | −9.3760E−04 | 8.1898E−05 |
| R7 | −6.0387E−02 | 3.5154E−02 | −1.1109E−02 | 1.8183E−03 | −1.2136E−04 |
| R8 | −4.3524E−02 | 1.7912E−02 | −4.6806E−03 | 6.9868E−04 | −4.4804E−05 |
| R9 | 0.0000E+00 | 0.0000E+00 | 0.0000E+00 | 0.0000E+00 | 0.0000E+00 |
| R10 | 0.0000E+00 | 0.0000E+00 | 0.0000E+00 | 0.0000E+00 | 0.0000E+00 |
| R11 | 3.1062E−04 | 8.3927E−05 | −2.8965E−05 | 3.4605E−06 | −1.5267E−07 |
| R12 | 1.1924E−03 | −1.3585E−04 | 9.6607E−06 | −3.9972E−07 | 7.4960E−09 |
| R13 | 2.2458E−05 | −1.0817E−06 | −2.1156E−08 | 3.3148E−09 | −7.8738E−11 |
| R14 | −3.1179E−05 | 2.3494E−06 | −1.2548E−07 | 3.9464E−09 | −5.3760E−11 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 |
|---|---|---|---|---|
| P1R1 | 1 | 1.635 | | |
| P1R2 | 1 | 1.165 | | |
| P2R1 | 0 | | | |
| P2R2 | 0 | | | |
| P3R1 | 3 | 0.345 | 1.415 | 1.725 |
| P3R2 | 2 | 0.515 | 1.485 | |
| P4R1 | 3 | 0.395 | 1.365 | 1.825 |
| P4R2 | 2 | 1.635 | 1.955 | |
| P5R1 | 2 | 0.855 | 2.175 | |
| P5R2 | 2 | 0.505 | 2.365 | |
| P6R1 | 2 | 0.755 | 2.285 | |
| P6R2 | 3 | 0.385 | 0.595 | 2.435 |
| P7R1 | 2 | 1.645 | 3.555 | |
| P7R2 | 3 | 0.605 | 3.205 | 3.825 |

TABLE 8

| | Number of arrest points | Arrest point position 1 | Arrest point position 2 | Arrest point position 3 |
|---|---|---|---|---|
| P1R1 | 0 | | | |
| P1R2 | 1 | 1.565 | | |
| P2R1 | 0 | | | |
| P2R2 | 0 | | | |
| P3R1 | 3 | 0.575 | 1.565 | 1.785 |
| P3R2 | 1 | 0.865 | | |
| P4R1 | 3 | 0.675 | 1.605 | 1.895 |
| P4R2 | 2 | 1.865 | 2.005 | |
| P5R1 | 1 | 1.395 | | |
| P5R2 | 1 | 1.215 | | |
| P6R1 | 1 | 1.355 | | |
| P6R2 | 0 | | | |
| P7R1 | 1 | 2.945 | | |
| P7R2 | 1 | 1.345 | | |

Figure 6:
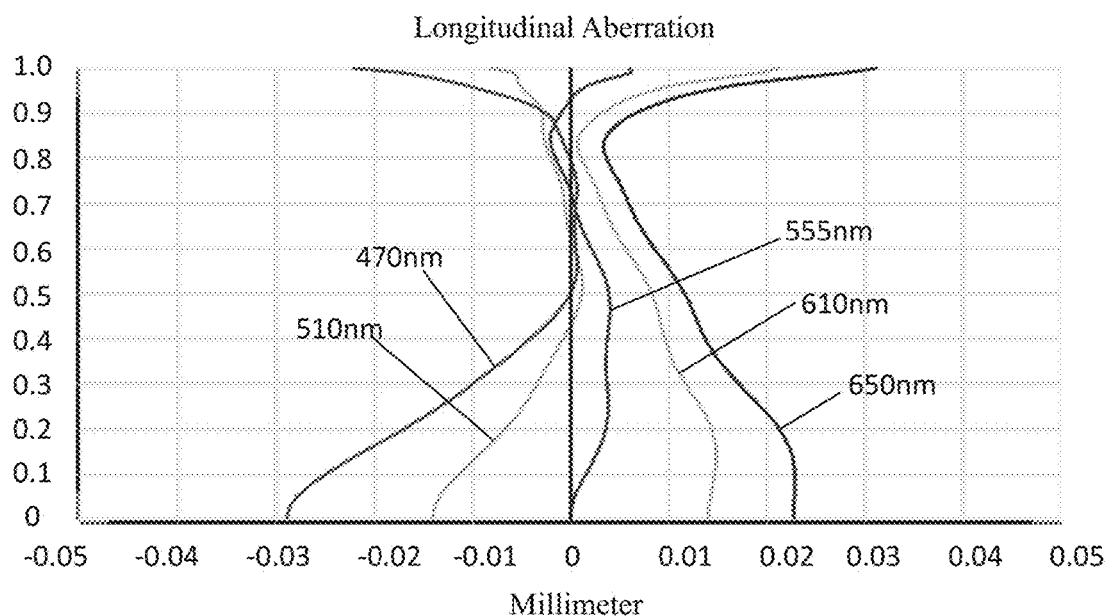
FIG. 6 is a schematic diagram of a longitudinal aberration of the camera optical lens shown in FIG. 5.
Figure 7:
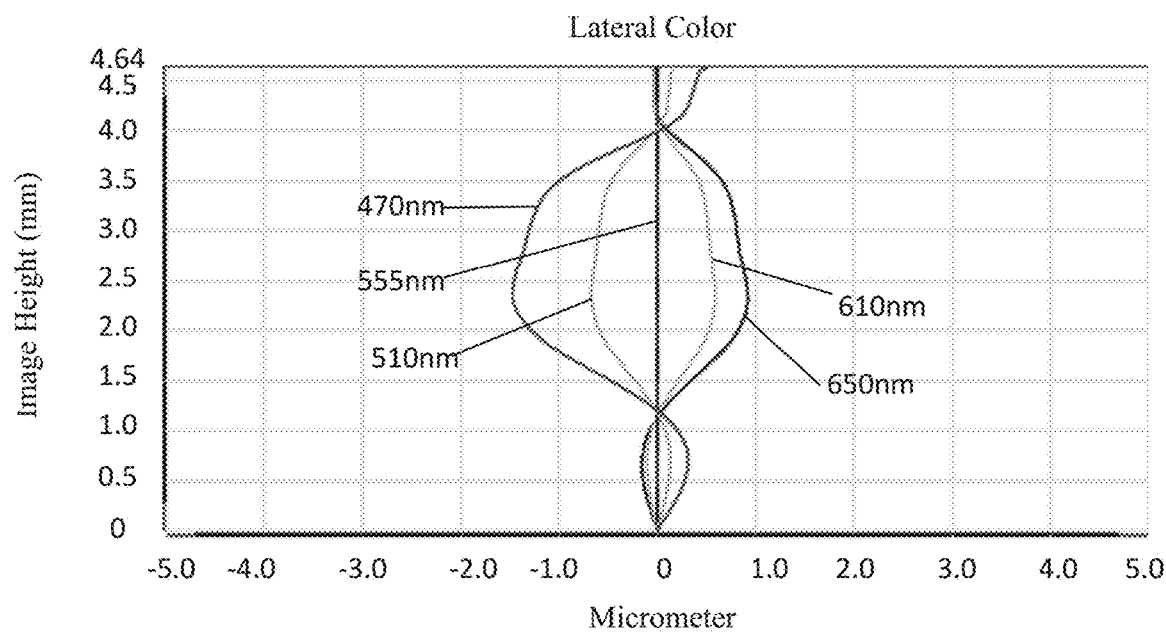
FIG. 7 is a schematic diagram of a lateral color of the camera optical lens shown in FIG. 5.
Figure 8:
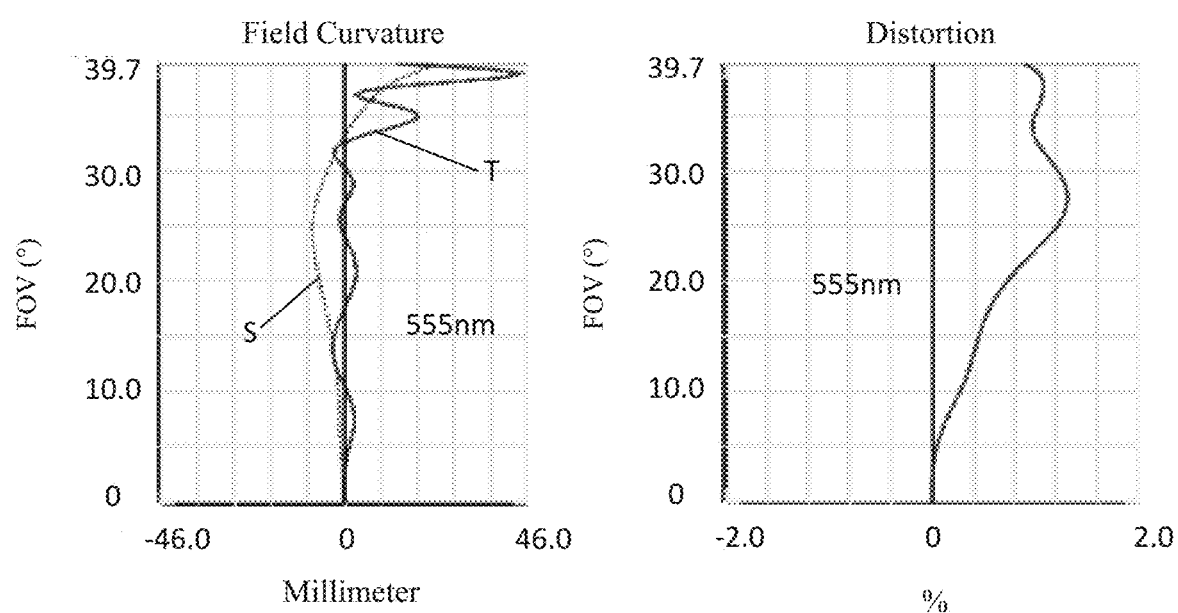
FIG. 8 is a schematic diagram of a field curvature and a distortion of the camera optical lens shown in FIG. 5.
Figure 9:
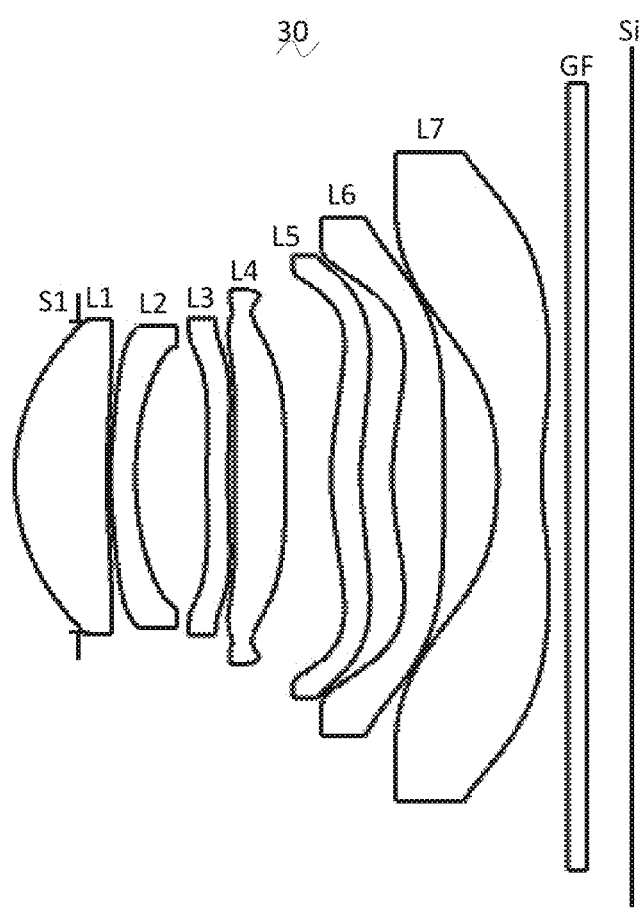
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 650 nm, 610 nm, 555 nm, 510 nm and 470 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 13, Embodiment 2 satisfies the respective conditions.

In this embodiment, the entrance pupil diameter of the camera optical lens is 3.462 mm. The image height of 1.0H is 4.636 mm. The FOV (field of view) along a diagonal direction is 79.40°. Thus, the camera optical lens can provide an ultra-thin, wide-angle lens while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

Table 9 and Table 10 show design data of a camera optical lens 30 in Embodiment 3 of the present disclosure.

TABLE 9

| | R | d | nd | vd |
|---|---|---|---|---|
| S1 | ∞ | d0 = −0.690 | | |
| R1 | 2.355 | d1 = 1.000 | nd1 1.5450 | v1 55.81 |
| R2 | 5.653 | d2 = 0.040 | | |
| R3 | 3.857 | d3 = 0.271 | nd2 1.6610 | v2 20.53 |
| R4 | 3.342 | d4 = 0.772 | | |
| R5 | 31.396 | d5 = 0.230 | nd3 1.6610 | v3 20.53 |
| R6 | 13.460 | d6 = 0.065 | | |
| R7 | 17.230 | d7 = 0.556 | nd4 1.5450 | v4 55.81 |
| R8 | −97.635 | d8 = 0.497 | | |
| R9 | 3.199 | d9 = 0.321 | nd5 1.6359 | v5 23.82 |
| R10 | 3.024 | d10 = 0.341 | | |
| R11 | 3.212 | d11 = 0.559 | nd6 1.5450 | v6 55.81 |
| R12 | −22.759 | d12 = 0.581 | | |
| R13 | −4.65 | d13 = 0.475 | nd7 1.5346 | v7 55.69 |
| R14 | 3.384 | d14 = 0.281 | | |
| R15 | ∞ | d15 = 0.210 | ndg 1.5168 | vg 64.17 |
| R16 | ∞ | d16 = 0.494 | | |

Table 10 shows aspheric surface data of respective lenses in the camera optical lens 30 according to Embodiment 3 of the present disclosure.

TABLE 10

| | Conic coefficient | Aspherical surface coefficients | | | |
|---|---|---|---|---|---|
| | k | A4 | A6 | A8 | A10 |
| R1 | −5.5151E−02 | 7.3633E−04 | −7.0579E−05 | 2.2909E−03 | −4.4161E−03 |
| R2 | −2.9507E+01 | −1.2319E−01 | 1.9659E−01 | −2.0636E−01 | 1.5541E−01 |
| R3 | 2.8711E+00 | −1.5488E−01 | 1.8303E−01 | −1.5779E−01 | 9.7293E−02 |
| R4 | 3.6466E+00 | −3.8980E−02 | 7.9666E−03 | 5.7588E−02 | −1.3333E−01 |
| R5 | 1.2000E+02 | −6.3842E−03 | −4.1839E−02 | 2.0602E−02 | 2.6179E−02 |
| R6 | −1.2299E+01 | −2.9581E−03 | −2.8539E−02 | −1.5541E−02 | 6.0365E−02 |
| R7 | 6.0305E+01 | −4.0473E−02 | 5.8845E−02 | −1.4463E−01 | 1.9682E−01 |
| R8 | −9.9000E+01 | −7.6146E−02 | 7.9648E−02 | −1.0696E−01 | 9.5192E−02 |
| R9 | −2.1192E+01 | −4.6255E−02 | 5.9662E−02 | −4.4304E−02 | 1.9106E−02 |
| R10 | −1.7612E+01 | −8.5747E−02 | 7.3597E−02 | −3.8411E−02 | 1.1580E−02 |
| R11 | −1.0638E+01 | −1.3258E−02 | −1.7009E−02 | 1.0497E−02 | −3.2823E−03 |
| R12 | 3.7556E+01 | 3.5838E−02 | −4.3144E−02 | 1.9521E−02 | −5.3313E−03 |
| R13 | −6.4756E−01 | −8.0914E−02 | 2.1283E−02 | −1.6548E−03 | −4.8776E−05 |
| R14 | −1.8678E+01 | −5.0838E−02 | 1.5887E−02 | −2.9708E−03 | 3.3372E−04 |

| | Aspherical surface coefficients | | | | |
|---|---|---|---|---|---|
| | A12 | A14 | A16 | A18 | A20 |
| R1 | 4.3584E−03 | −2.5363E−03 | 8.6549E−04 | −1.6214E−04 | 1.2609E−05 |
| R2 | −8.3936E−02 | 3.1358E−02 | −7.6449E−03 | 1.0889E−03 | −6.8503E−05 |
| R3 | −4.2913E−02 | 1.3352E−02 | −2.7776E−03 | 3.4753E−04 | −1.9048E−05 |
| R4 | 1.5965E−01 | −1.1824E−01 | 5.4070E−02 | −1.3972E−02 | 1.5622E−03 |
| R5 | −6.5907E−02 | 5.9915E−02 | −2.8976E−02 | 7.3865E−03 | −7.7001E−04 |
| R6 | −6.4279E−02 | 3.4507E−02 | −1.0000E−02 | 1.5152E−03 | −9.6044E−05 |
| R7 | −1.5872E−01 | 7.7023E−02 | −2.1902E−02 | 3.3637E−03 | −2.1584E−04 |
| R8 | −5.6203E−02 | 2.1942E−02 | −5.4386E−03 | 7.7347E−04 | −4.7568E−05 |
| R9 | −5.3589E−03 | 8.9981E−04 | −6.7845E−05 | −1.8841E−06 | 4.7003E−07 |
| R10 | −2.0908E−03 | 1.7910E−04 | 6.4599E−06 | −2.7448E−06 | 1.6955E−07 |
| R11 | 2.1018E−04 | 1.3130E−04 | −3.8453E−05 | 4.4053E−06 | −1.9073E−07 |
| R12 | 8.9475E−04 | −9.0818E−05 | 5.3702E−06 | −1.6737E−07 | 2.0620E−09 |
| R13 | 1.2135E−05 | 1.5626E−07 | −1.0792E−07 | 6.9954E−09 | −1.3521E−10 |
| R14 | −2.4174E−05 | 1.1849E−06 | −4.1072E−08 | 1.0538E−09 | −1.6094E−11 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 1.635 | | |
| P1R2 | 3 | 0.475 | 0.745 | 1.145 |
| P2R1 | 0 | | | |
| P2R2 | 0 | | | |
| P3R1 | 3 | 0.385 | 1.425 | 1.615 |
| P3R2 | 3 | 0.525 | 1.455 | 1.735 |
| P4R1 | 3 | 0.425 | 1.365 | 1.815 |
| P4R2 | 2 | 1.625 | 1.975 | |
| P5R1 | 2 | 0.955 | 2.185 | |
| P5R2 | 2 | 0.575 | 2.355 | |
| P6R1 | 2 | 0.745 | 2.265 | |
| P6R2 | 1 | 2.435 | | |
| P7R1 | 1 | 1.665 | | |
| P7R2 | 2 | 0.585 | 3.305 | |

TABLE 12

| | Number of arrest points | Arrest point position 1 | Arrest point position 2 | Arrest point position 3 |
|---|---|---|---|---|
| P1R1 | 0 | | | |
| P1R2 | 1 | 1.555 | | |
| P2R1 | 0 | | | |
| P2R2 | 0 | | | |
| P3R1 | 1 | 0.595 | | |
| P3R2 | 1 | 0.835 | | |
| P4R1 | 3 | 0.715 | 1.605 | 1.875 |
| P4R2 | 2 | 1.845 | 2.035 | |
| P5R1 | 2 | 1.485 | 2.315 | |
| P5R2 | 1 | 1.375 | | |
| P6R1 | 1 | 1.315 | | |
| P6R2 | 0 | | | |
| P7R1 | 1 | 3.065 | | |
| P7R2 | 1 | 1.255 | | |

Figure 10:
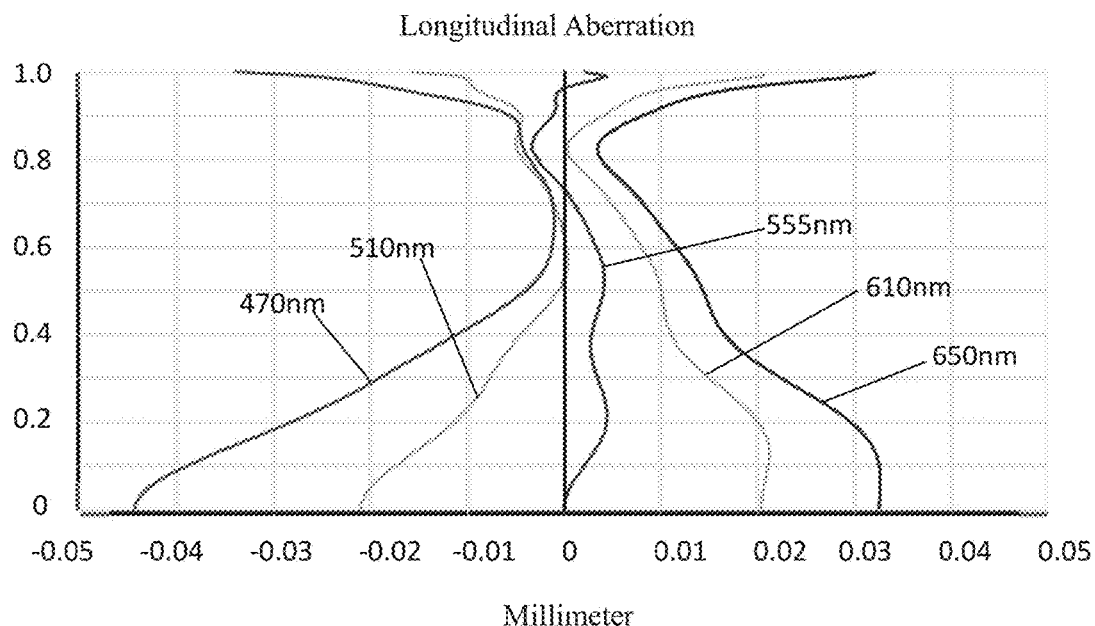
FIG. 10 is a schematic diagram of a longitudinal aberration of the camera optical lens shown in FIG. 9.
Figure 11:
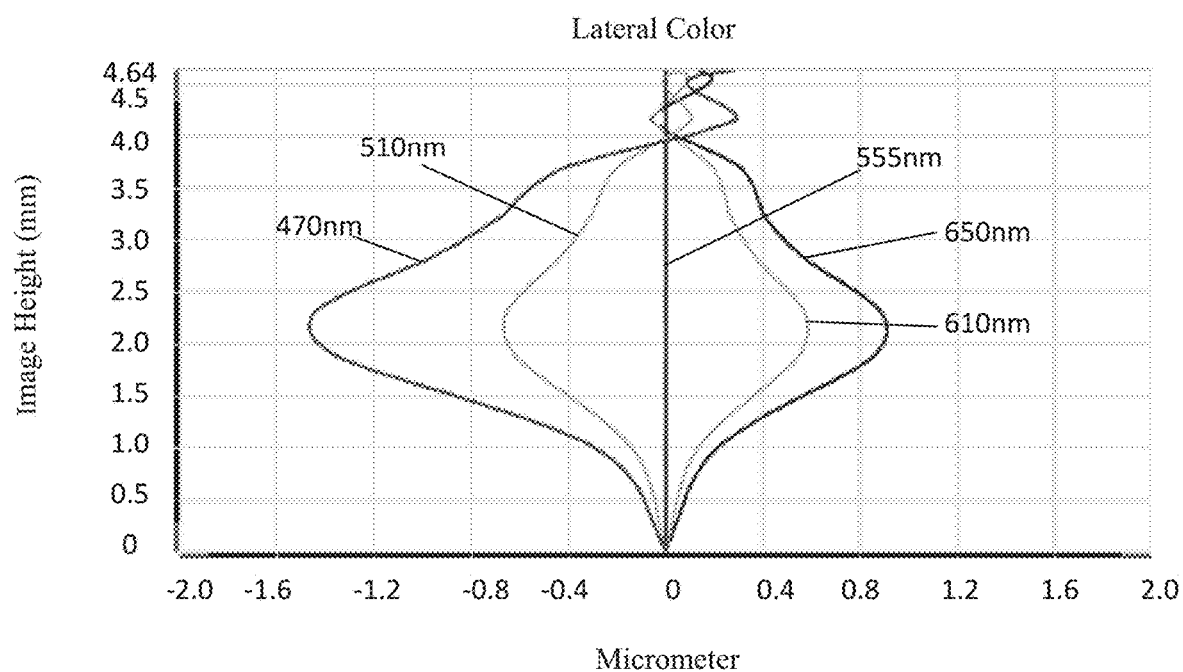
FIG. 11 is a schematic diagram of a lateral color of the camera optical lens shown in FIG. 9.
Figure 12:
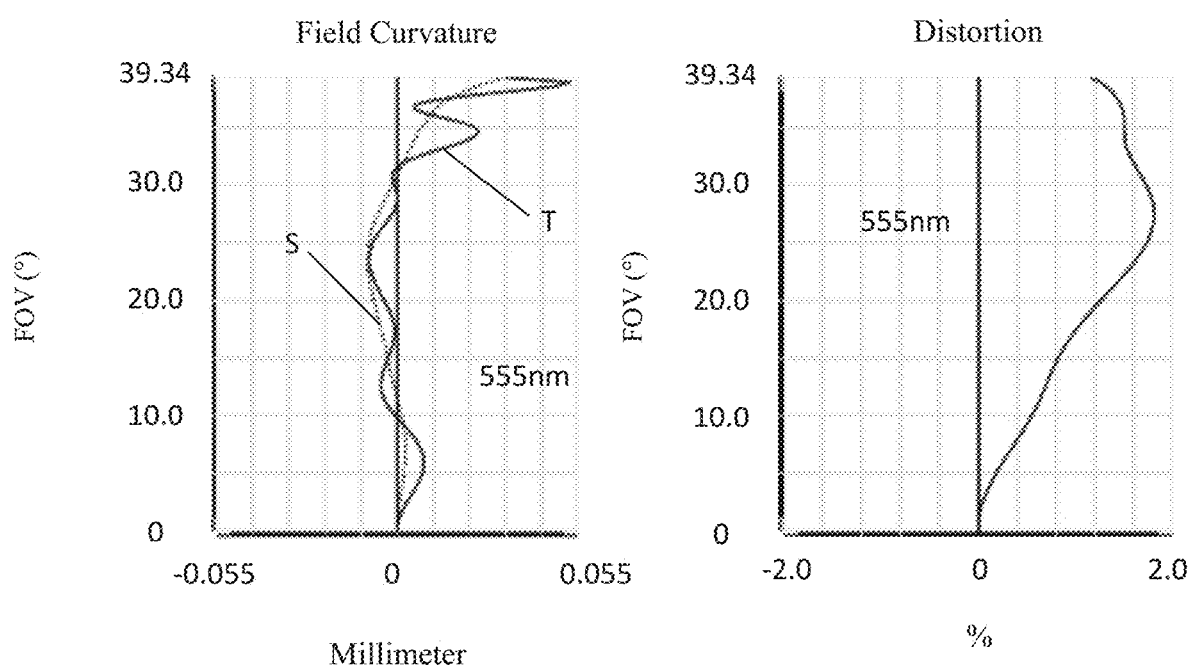
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30 according to Embodiment 3. FIG. 12 illustrates field curvature and distortion of light with a wavelength of 555 nm after passing the camera optical lens 30 according to Embodiment 3.

Table 13 below further lists various values of the present embodiment and values corresponding to parameters which are specified in the above conditions. Obviously, the camera optical lens according to this embodiment satisfies the above conditions.

In this embodiment, the entrance pupil diameter of the camera optical lens is 3.494 mm. The image height of 1.0H is 4.636 mm. The FOV (field of view) along a diagonal direction is 78.68°. Thus, the camera optical lens can provide an ultra-thin, wide-angle lens while having on-axis and off-axis aberrations sufficiently corrected, thereby leading to better optical characteristics.

TABLE 13

| Parameters and Conditions | Embodiment 1 | Embodiment 2 | Embodiment 3 |
|---|---|---|---|
| f4/f | 2.716 | 3.451 | 4.799 |
| f6/f7 | −1.178 | −1.290 | −1.450 |
| d8/d9 | 1.403 | 1.210 | 1.548 |
| f | 5.540 | 5.539 | 5.591 |
| f1 | 5.758 | 6.098 | 6.670 |
| f2 | −18.449 | −27.905 | −47.631 |
| f3 | −22.638 | −22.188 | −35.514 |
| f4 | 15.046 | 19.113 | 26.832 |
| f5 | −20.224 | −34.025 | −305.158 |
| f6 | 4.262 | 4.321 | 5.188 |
| f7 | −3.617 | −3.349 | −3.578 |
| f12 | 7.496 | 7.209 | 7.296 |
| Fno | 1.600 | 1.600 | 1.600 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, sequentially comprising, from an object side to an image side:
    a first lens having a positive refractive power;
    a second lens having a negative refractive power;
    a third lens having a negative refractive power;
    a fourth lens having a positive refractive power;
    a fifth lens having a negative refractive power;
    a sixth lens having a positive refractive power; and
    a seventh lens having a negative refractive power,
    wherein the camera optical lens satisfies following conditions:

$1.80 \leq f4/f \leq 5.00;$ $-1.50 \leq f6/f7 \leq -1.00;$ $1.20 \leq d8/d9 \leq 1.60;$ $-12.70 \leq f3/f \leq -2.67;$ $1.17 \leq (R5+R6)/(R5-R6) \leq 4.73;$ and $0.02 \leq d5/TTL \leq 0.06,$ where
    f denotes a focal length of the camera optical lens;
    f4 denotes a focal length of the fourth lens;
    f6 denotes a focal length of the sixth lens;
    f7 denotes a focal length of the seventh lens;
    d8 denotes an on-axis distance from an image side surface of the fourth lens to an object side surface of the fifth lens;
    d9 denotes an on-axis thickness of the fifth lens;
    f3 denotes a focal length of the third lens;
    R5 denotes a curvature radius of an object side surface of the third lens;
    R6 denotes a curvature radius of an image side surface of the third lens;
    d5 denotes an on-axis thickness of the third lens; and
    TTL denotes a total optical length from an object side surface of the first lens to an image plane of the camera optical lens along an optic axis.

2. The camera optical lens as described in claim 1, further satisfying a following condition:

$-0.80 \leq (R7+R8)/(R7-R8) \leq -0.10,$ where
    R7 denotes a curvature radius of an object side surface of the fourth lens; and
    R8 denotes a curvature radius of the image side surface of the fourth lens.

3. The camera optical lens as described in claim 1, further satisfying a following condition:

$3.00 \leq (R3+R4)/(R3-R4) \leq 15.00,$ where R3 denotes a curvature radius of an object side surface of the second lens; and
    R4 denotes a curvature radius of an image side surface of the second lens.

4. The camera optical lens as described in claim 1, further satisfying following conditions:

$0.52 \leq f1/f \leq 1.79;$ $-4.86 \leq (R1+R2)/(R1-R2) \leq -1.19;$ and $0.07 \leq d1/TTL \leq 0.22$ where
    f1 denotes a focal length of the first lens;
    R1 denotes a curvature radius of an object side surface of the first lens;
    R2 denotes a curvature radius of an image side surface of the first lens;
    d1 denotes an on-axis thickness of the first lens; and
    TTL denotes a total optical length from the object side surface of the first lens to an image plane of the camera optical lens along an optic axis.

5. The camera optical lens as described in claim 1, further satisfying following conditions:

$-17.04 \leq f2/f \leq -2.22;$ and $0.02 \leq d3/TTL \leq 0.06,$ where
    f2 denotes a focal length of the second lens;
    d3 denotes an on-axis thickness of the second lens; and
    TTL denotes a total optical length from an object side surface of the first lens to an image plane of the camera optical lens along an optic axis.

6. The camera optical lens as described in claim 1, further satisfying following conditions:

$-109.16 \leq f5/f \leq -2.43$ $3.34 \leq (R9+R10)/(R9-R10) \leq 53.34;$ and $0.02 \leq d9/TTL \leq 0.08,$ where
    f5 denotes a focal length of the fifth lens;
    R9 denotes a curvature radius of the object side surface of the fifth lens;
    R10 denotes a curvature radius of an image side surface of the fifth lens;
    d9 denotes an on-axis thickness of the fifth lens; and
    TTL denotes a total optical length from an object side surface of the first lens to an image plane of the camera optical lens along an optic axis.

7. The camera optical lens as described in claim 1, further satisfying following conditions:

$0.38 \leq f6/f \leq 1.39;$ $-1.54 \leq (R11+R12)/(R11-R12) \leq -0.50;$ and $0.04 \leq d11/TTL \leq 0.13,$ where
R11 denotes a curvature radius of an object side surface of the sixth lens;
R12 denotes a curvature radius of an image side surface of the sixth lens;
d11 denotes an on-axis thickness of the sixth lens; and
TTL denotes a total optical length from an object side surface of the first lens to an image plane of the camera optical lens along an optic axis.

8. The camera optical lens as described in claim 1, further satisfying following conditions:

$$-1.31 \leq f7/f \leq -0.40$$

$$0.07 \leq (R13+R14)/(R13-R14) \leq 0.32; \text{ and}$$

$$0.03 \leq d13/TTL \leq 0.11,$$

where
R13 denotes a curvature radius of an object side surface of the seventh lens;
R14 denotes a curvature radius of an image side surface of the seventh lens;
d13 denotes an on-axis thickness of the seventh lens; and
TTL denotes a total optical length from an object side surface of the first lens to an image plane of the camera optical lens along an optic axis.

9. The camera optical lens as described in claim 1, further satisfying a following condition:

$$5.77 \leq f12/f \leq 9.00,$$

where
f12 denotes a combined focal length of the first lens and the second lens.

* * * * *